US006610981B2

(12) United States Patent
Sommer, Jr.

(10) Patent No.: US 6,610,981 B2
(45) Date of Patent: Aug. 26, 2003

(54) METHOD AND APPARATUS FOR NEAR-INFRARED SORTING OF RECYCLED PLASTIC WASTE

(75) Inventor: Edward J. Sommer, Jr., Nashville, TN (US)

(73) Assignee: National Recovery Technologies, Inc., Nashville, TN (US)

( * ) Notice: Subject to any disclaimer, the term of this patent is extended or adjusted under 35 U.S.C. 154(b) by 185 days.

(21) Appl. No.: 09/841,519

(22) Filed: Apr. 24, 2001

(65) Prior Publication Data

US 2001/0045518 A1 Nov. 29, 2001

Related U.S. Application Data

(60) Provisional application No. 60/200,720, filed on Apr. 27, 2000.

(51) Int. Cl.[7] .......... G01J 5/02

(52) U.S. Cl. .......... 250/339.06; 250/339.01

(58) Field of Search .......... 250/339.06, 338.1, 250/370.06, 503.1, 341.8, 339.11, 341.1, 340, 336.1, 339.12, 358.1, 359.1, 360.1, 223 R, 223 B

(56) References Cited

U.S. PATENT DOCUMENTS

| | | | | |
|---|---|---|---|---|
| 5,134,291 | A | 7/1992 | Ruhl, Jr. et al. | 250/341 |
| 5,141,110 | A | 8/1992 | Trischan et al. | 209/524 |
| 5,150,307 | A | 9/1992 | McCourt et al. | 364/478 |
| 5,223,917 | A | 6/1993 | Richert | 356/407 |
| 5,260,576 | A | 11/1993 | Sommer, Jr. et al. | 250/359.1 |
| 5,314,072 | A | 5/1994 | Frankel et al. | 209/44.1 |
| 5,318,172 | A | 6/1994 | Kenny et al. | 209/524 |
| 5,339,962 | A | 8/1994 | Sommer, Jr. et al. | 209/576 |
| 5,443,164 | A | 8/1995 | Walsh et al. | 209/580 |
| 5,502,559 | A | 3/1996 | Powell et al. | 356/76 |
| 5,518,124 | A | 5/1996 | Sommer, Jr. et al. | 209/577 |
| 5,536,935 | A | 7/1996 | Klotzsch et al. | 250/223 B |
| 5,675,416 | A | 10/1997 | Campbell et al. | 356/367 |
| 5,966,217 | A | * 10/1999 | Roe et al. | 356/402 |
| RE36,537 | E | 2/2000 | Sommer, Jr. et al. | 209/576 |

OTHER PUBLICATIONS

D.M. Scott, "A two-color near-infrared sensor for sorting recycled plastic waste", Measurement Science & Technology 6 (1995) 156-159.

D.N. Scott and R.L. Waterland, "Identification of Plastic Waste Using Spectroscopy and Neural Networks", Polymer Engineering and Science, Jun. 1995, vol. 35, No. 12, 1011-1015.

M.K. Alam, S.L. Stanton, G.A. Hebner, "Near-Infrared Spectroscopy and Neural Networks for Resin Identification," Spectroscopy, Feb. 1994, 30-38.

* cited by examiner

*Primary Examiner*—David Porta
*Assistant Examiner*—Christine Sung
(74) *Attorney, Agent, or Firm*—Wyatt, Tarrant & Combs, L.L.P.

(57) ABSTRACT

Method and apparatus for sorting plastic materials on a recycling operation wherein near and infrared energy illuminates particles of flake plastic including such as PET, PVC and PS transported along a conveyer line and the contaminant ingredients are identified and ejected from the stream of preferred particles. More accurate sorting, and thus a higher quality sort may be performed where the contaminant materials and the preferred materials are identified by comparing ratios of levels of signals of energy transmitted through or reflected from the particles, the levels of signal being obtained by filtering the energy from the particles through bandpass filters, one filter of which is centered on the absorptive peak of a contaminant and another filter is centered on a frequency exhibiting the energy level of the preferred material equal to that occurring at the center of the filter for the contaminant absorptive peak. Collateral method and apparatus include placing the fiber optic energy receivers of the transmitter and received information at a distance from the receiver a factor or five or more of the ratio of the field of view of a fiber at the particle stream to the maximum offset of the receiving fibers in the faceplate, as those opposite each other on a diameter of the faceplate.

30 Claims, 4 Drawing Sheets

METHOD AND APPARATUS FOR NEAR-INFRARED SORTING OF RECYCLED PLASTIC WASTE

CROSS-REFERENCE TO RELATED APPLICATION

This application claims benefit of U.S. Provisional Application No. 60/200,720 filed Apr. 27, 2000.

STATEMENT REGARDING FEDERALLY SPONSORED RESEARCH OR DEVELOPMENT

This invention was made with the support of the United States Government under Contract No. 68D98157 having an effective date of Sep. 16, 1998, awarded by the Environmental Protection Agency. The U.S. Government has certain rights in this invention.

BACKGROUND OF THE INVENTION

Field of the Invention

The present invention is directed to a method and apparatus for the sorting of plastic materials by utilizing a known characteristic in such materials when penetrating electromagnetic radiation is directed at the materials and passes through and/or is reflected from and exhibits differing levels of attenuation at different frequencies. The present method and apparatus provide for the separation of the differing plastic materials from each other according to the amount of radiation passing through and/or reflected from particulate materials.

Those skilled in the art are aware that one of the techniques of recycle sorting various plastic materials such as plastic bottles and other similar containers is to grind the materials into particulate or flake matter generally so as to have a flake size of about an eighth of an inch to perhaps as much as a half an inch in width or diameter. It is likewise well known that in order for the sorting of such materials to be recycled economically, they must be processed at relatively high volumes and with a fairly high accuracy in the identification and/or ejection of contaminant or non-selected material. Accordingly, the sorting of plastics is conventionally done in a conveyor operation wherein the materials to be sorted, whether bottles or flake material, are moved along via the conveyor or similar moving carrier to be irradiated by an electromagnetic energy source, such as at near infrared radiation, and the electromagnetic energy passing through the various irradiated articles is detected by one or more detectors, and according to a preselected scheme of determination and evaluation of relative levels of transmitted or reflected electromagnetic energy, various of the passing articles or material are ejected from the stream. U.S. Pat. Nos. 5,966,217; 5,318,172; 5,260,576; RE536,537; and 5,536,935 illustrate differing systems where the conveying of plastic materials to be sorted pass an electromagnetic radiation source and the detection of rays of reflected or transmitted radiation for the later sorting out of the contaminant material by such as being ejected by a blast of air being projected across the stream of materials in a relevant sector.

Two very common materials used for the manufacture of bottles and similar containers are polyethylene terephthalate, commonly known as PET, and polyvinyl chloride (PVC), two resins which are difficult to distinguish by sight alone. Since the materials are common in the manufacture of various bottles and containers, it is not uncommon for manufacturers of any particular bottle to alternate between the two materials based upon availability of material, further complicating the sorting task. It is essential to distinguish correctly between these particular polymers because the presence of PVC in the remolding process of PET bottles incorporating recycled material, even at very low level of occurrence such as a few parts per million, will destroy the uniformity and utility of the PET material.

A paper by D. M. Scott entitled, "A Two Color Near-Infrared Sensor for Sorting Recycled Plastic Waste," appearing in *Measurement Science&Technology,* Volume 6 (1995), pages 156–159, describes one approach of using near-infrared radiation in a method and apparatus for sorting of PET and PVC materials. The method and apparatus for sorting the materials in the Scott paper, incorporates a method of sorting which utilizes the known dominant peaks of absorption in PET of 1660 nm and for PVC, 1716 nm. The fact that these wave lengths lie in a relatively transmissive portion of the absorption spectrum of water was reported by Scott to be favorable in that water is a common contaminant on plastic materials being recycled by virtue of their being previously washed or otherwise cleaned of various of the debris and contaminants of the particular containers. Scott reports that PET may be distinguished from PVC by measuring the ratio of the transmission levels of the IR energy through the two materials at the identified peaks, noting that if the polymer is PVC then the ratio will be greater that unity, whereas if the material is PET, the ratio will be less than unity. As further reported by Scott, an additional benefit of the technique of using ratio measurement is that it removes some of the effects of sample thickness. As will be recognized by those skilled in the art, there is a great deal of non-uniformity in thickness and size of plastic materials undergoing a sort process, a characteristic which also carries over to the sorting of such plastics in flake form. This is a well known impediment to the use of this method in the sorting of flake. U.S. Pat. No. 5,966,217 to Roe et at, reports an essentially identical method for the sorting of PET from PVC. The '217 patent describes a similar method and apparatus to the Scott paper for to sorting of PET from PVC as well as other materials such as polyethylene naphthalate (PEN). Both the Scott paper and the '217 patent illuminate the passing plastic material with a near-infrared wave length of radiation, covering the absorption peaks of approximately 1660 nm and 1716 nm, and receiving either directly or by reflection or a combination thereof of the energy passing through the inspected plastics, the radiation being collected and then split to be analyzed after passing through the respective wavelength filters and detectors respectively passing the energy at or near one or the other of the selected wave lengths. Both these references appear to be directed to the sorting of crushed bottles or containers and neither appear to recognize the importance of a method and system for the sorting of flake materials where it is common that more than one flake may be stacked or bunched so as to obscure or complicate the transmission of the electromagnetic energy and the analysis of the received energy.

An alternative approach to sorting of plastic containers is described in U.S. Pat. No. 5,134,291 wherein the infrared reflected from the plastic article is normalized to 1600 and compared to the absorptive peaks of particular plastics.

Another approach for sorting plastics is described in U.S. Pat. No. 5,675,416 wherein flakes of material are examined (somewhat similar to Scott), however, the analysis is based on examining the birefringence characteristics as opposed to IR transmission on reflection characteristics. U.S. Pat. No. 5,339,962, assigned to the owner of the present application, illustrates apparatus for conveying flakes of plastic materials from an inlet, through an illumination zone to an outlet including ejection of contaminant particles by air blast.

The Scott paper describes utilizing a lens to focus the illuminating IR source on the sample and a gold-plated screen type of beam splitter to separate the transmitted energy into two streams for analysis, including the respective filters, lenses and detectors for the selected wavelengths and the ratioing of their outputs. Patent '217 utilizes a fiber optic splitter rather than the Scott screen, but otherwise focuses by means of lenses, the IR beam on the sample and the transmitted energy on to the fiber optic faceplate. Patent '217 also describes the ratioing of the respective wavelengths of energy transmitted through the sample at the absorption peaks of PET and PVC, i.e., 1660 nm and 1720 nm. Other than the slight difference in apparatus for splitting the beam of transmitted energy from the sample to the filters, there is little variance in the method and apparatus for distinguishing the materials. The present invention is directed to method and apparatus which are particularly effective in the sorting of particulate plastics such as PET and PVC in whole container form, however, is also particularly effective at the separating of flake from plastic containers, which is a departure from the prior art.

SUMMARY OF THE INVENTION

The present invention encompasses a method of distinguishing at least two plastic materials, having different electromagnetic radiation absorption and penetration characteristics by conveying materials to be distinguished from at least one inlet end toward at least one outlet end through an illumination zone, then illuminating the materials in the illumination zone by a source of electromagnetic radiation. The electromagnetic radiation passes through or is reflected from the illuminated materials, or both, and the subsequent steps include splitting the received electromagnetic radiation into a first stream and a second stream; filtering said first stream to pass a preselected wavelength band, said preselected band including an absorptive peak of the electromagnetic radiation illuminating the first of two plastic materials and a higher electromagnetic energy level of transmission or reflection of the second of the two plastic materials; filtering said second stream to pass a preselected wavelength band which includes a band centered at a wavelength wherein the level of energy passed or reflected by the sample of the second material is about equal to the level electromagnetic transmission or reflection of the second of two plastic materials in the wavelength band passing in said first filtered stream; then measuring the strength of a passed sample of said first passed wavelength band; measuring the strength of a passed sample of said second passed wavelength band; then comparing the respective strengths of said first and second passed wavelength bands.

Another object of the present invention encompasses an apparatus for distinguishing at least two plastic materials having different electromagnetic radiation absorption and penetration characteristics comprising means for conveying materials to be distinguished from at least one inlet end toward at least one outlet end through an illumination zone; means for illuminating the materials in the illumination zone by a source of electromagnetic radiation, the source being disposed adjacent to said materials in the illumination zone; means for receiving the electromagnetic radiation passing through or reflected from the illuminated materials, or both, comprising a fiber optic cable having at least two sets of a plurality of individual fibers for carrying received electromagnetic radiation, the receiving end of said fiber optic cable being disposed adjacent to said illumination zone at a distance sufficient for each fiber of each of sets of fibers to receive substantially the same view as any other of the fibers of the electromagnetic radiation passing through or reflected from said materials, or both; means for splitting the received electromagnetic radiation into a first stream composed of the first set of individual fibers and a second stream composed of the second set of individual fibers; means for filtering said first stream to pass a preselected wavelength band, said preselected band centered on an absorptive peak of the electromagnetic radiation illuminating the first of two plastic materials and exhibiting a higher electromagnetic radiation transmission level of the second of the two plastic materials; means for filtering said second stream to pass a preselected wavelength band said preselected band including a band centered at a wavelength wherein the level of energy passed or reflected by the sample of the second material is about equal to the electromagnetic energy level passed or reflected by the second of two plastic materials in the wavelength band passing in the first filtered stream; means for measuring the strength of the energy of the first passed wavelength band then measuring the strength of the energy of the second passed wavelength band and comparing the respective strengths of the energy passed by the first and second passed wavelength bands.

DESCRIPTION OF THE PREFERRED EMBODIMENTS

Figure 1:
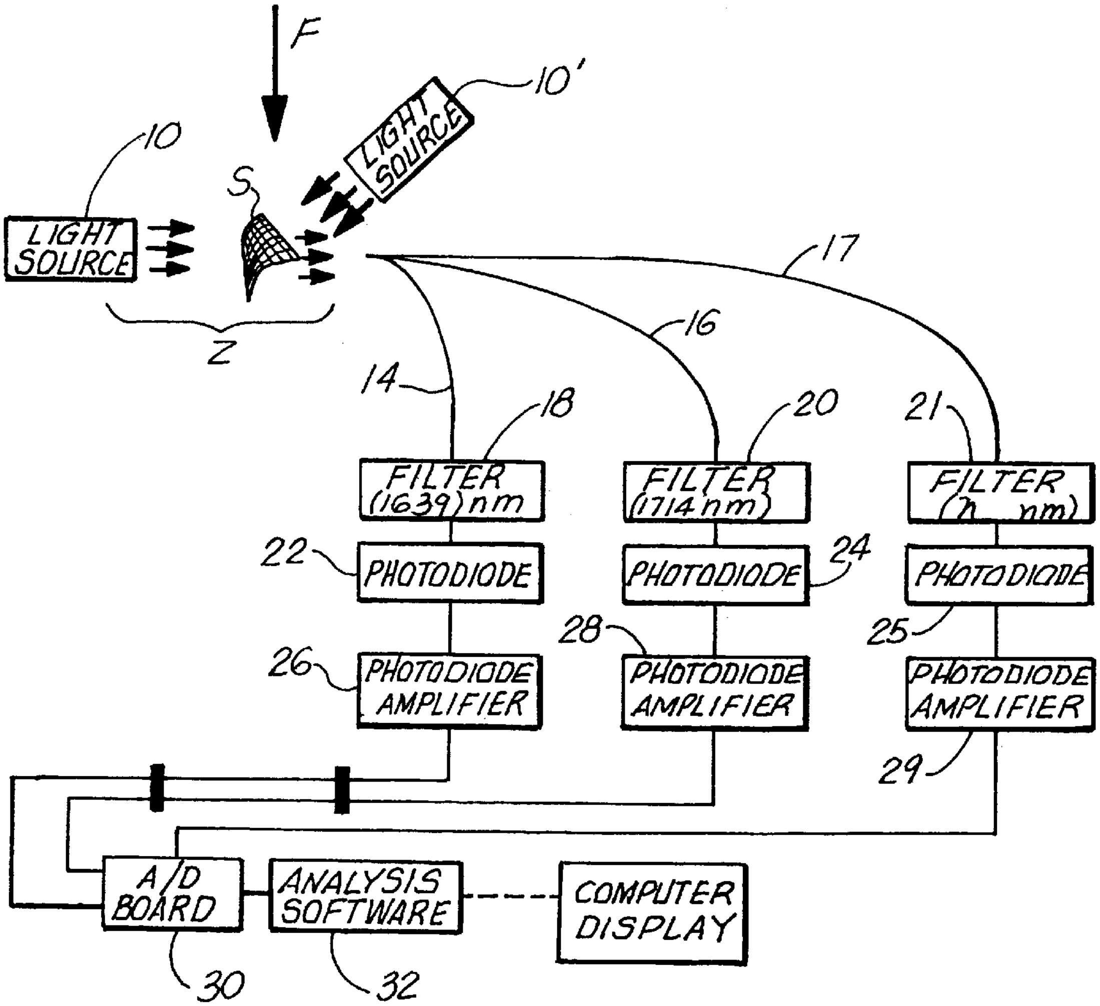
FIG. 1 is a block diagram of the apparatus and method of the present invention.
Figure 3A:
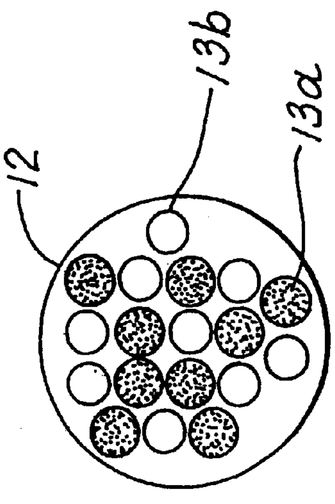
FIG. 3 is a partial elevation of the apparatus and method of the present invention.

Referring now to the drawings and FIG. 1 in particular, the electromagnetic signal and processing flow of the infrared sorting system according to a preferred embodiment of the present invention is illustrated. As will subsequently become apparent, the sorting system of the present invention, whether utilized for particulate material, commonly known in the sorting industry as "flake" material, or for bottles themselves, the basic transfer mechanisms for the movement of materials through the sorting system are generally similar to those employed in the prior art. As may be seen in FIG. 4, material is carried to the inspection station Z usually via a conveyor or by incline chutes where the material passes through the inspection station Z wherein it is irradiated by an electromagnetic radiation source, which in the present embodiment is an infrared source, such as either tungsten or tungsten-halogen lamp as available from such as Gilway Technical Lamps Company. After the materials to be examined and/or sorted pass the inspection station Z, the microprocessor in the sorting apparatus interrogates the detector system for the electromagnetic radiation transmitted through or reflected from the material which is evaluated and subsequently provided as a read-out or, in the case of a sorting system an ejection of the contaminant material via such as an air ejection system. As illustrated in FIG. 1 for the embodiment using transmission of the energy through a flake sample S, infrared light source 10 is disposed adjacent the flow path F of the material stream composed of a plurality of samples (i.e., flakes) S. In the alternative embodiment for operation in the reflection mode or in combined transmission mode, source 10' is positioned as shown. As flake sample S proceeds through the sorting apparatus along the path indicated by arrow F, it is illuminated by radiation source 10 and/or 10' and the light transmitted through or reflected from sample S is collected at fiber optic faceplate 12 disposed on the end of fiber optic cable 13. As later described, the light energy impinging on faceplate 12 is collected and transmitted through the individual fiber optic strands (see FIG. 3A) forming fiber optic cable branch 14 and cable branch 16 in the present described embodiment wherein two plastic materials and two selected wave lengths of transmitted light are to be examined and analyzed. The collected light in branches 14 and 16 are carried to respective filters 18 and 20 which in the preferred embodiments are selected to pass a band of wave lengths of light centered on 1639 nm and 1714 nm, with each of the band widths (such as filters 1639BW30 and 1714 BW30 from Omega Optical Company), being approximately 30 nm in width for reasons discussed subsequently. The lightwave lengths passing filters 18 and 20 respectively are then directed to photodiode detectors 22 and 24 such as Indium Arsenide ($I_nA_s$) or Indium Gallium Arsenide ($I_nGA_s$) (from such as EGG and Sensors Unlimited) wherein the received electromagnetic energy (infrared light) is converted into an electrical signal. The output signal of each photodiode 22 and 24 is proportional to the amount of infrared light striking the detection surfaces or photodiodes 22 and 24. The output of the photodiode amplifiers 26 and 28 is sent to an analog to digital circuit board 30 where each signal is digitized. The digitized signal from each of the respective fiber optic branches 14 and 16 is analyzed by software in a microprocessor chip such as a Shark Processor Chip from Analog Devices.

Microprocessor 32 analyzes a series of readings taken during the course of time which samples S pass the light source and the signal information is captured at faceplate 12. The several readings are analyzed by microprocessor 32 which then makes a decision based upon the particular polymer type observed, whether or not the sample item observed should be removed from the feed stream, as by air ejection, as is understood by those skilled in the art. In the present invention, the illustrated system is for the identification of PVC residing as a contaminant within a PET feed stream, and accordingly, upon being detected, the PVC is selected for ejection and removed from the feed stream at the air ejection station (subsequently described). The present invention is particularly effective for the removing of contaminants and especially PVC in flake form from a PET stream wherein several flakes may be stacked or bunched together. Likewise the system may be readily adapted to identify, analyze and remove other common contaminants from streams, such as PEN (polyethylene naphthalate) and PS (polystyrene), by selecting appropriate filters for known absorption peaks for the contaminant material and applying the inventive methodology. Such adaptations can include the addition of additional fiber optic splitting and cable branches 17, filters 21, detectors 25 and amplifiers 29 input to the board 30 as each may be dictated by the additional material to be identified.

Figure 2:
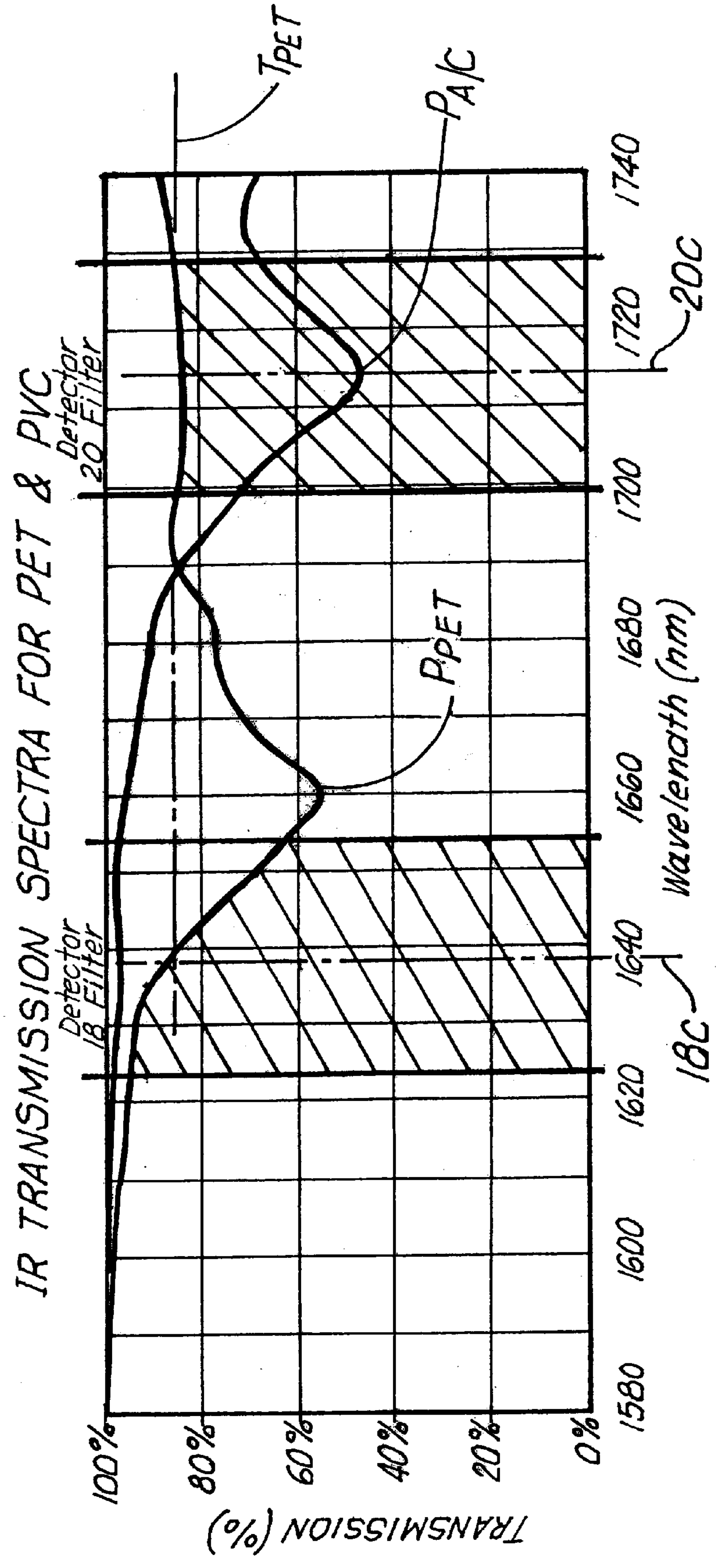
FIG. 2 is a graph of the IR Transmission Spectra for PET and PVC according to the method of the present invention.

Referring now to FIG. 2, the inventive process for reliable detection and ejection of contaminants such as PVC from essentially a PET feed stream is described. According to the present invention, filter 18 is selected to pass a bandwidth of 30 nm wavelength ranging from 1624 nm to 1654 nm centered at 1639 nm. The filter 20 is selected to pass a range of 30 nm from 1699 nm to 1729 nm centered at 1714 nm, a bandwidth which provides a sufficient level signal for processing. Viewing the IR transmission or reflection spectra for PET and PVC, which is illustrated in FIG. 2, shows that the wavelengths selected are unconventional in respect to the methodology disclosed by the paper by Scott and the '217 patent. Filter 20 bandwidth is centered (centerline $\mathbf{20}_c$) generally on the absorption peak of IR energy for PVC or approximately 1714 nm as indicated at centerline $\mathbf{20}_c$ on FIG. 2 (similar to Scott). The wavelength for filter 18 is centered (centerline $\mathbf{18}_c$), at 1639 nm being offset from the absorption peak $P_{PET}$ of PET. Filter 18 for detector 22 is chosen so that it transmits a level of signal approximately equal to the relative level of infrared light from PET as does filter 20 for detector 24, which was chosen centered on the absorptive peak of PVC. In the graph illustrated, the PVC levels are approximately 55% for filter 24 and 98% for filter 18 as indicated by the IR transmission line indicated for PVC. Conversely, the transmission levels for PET at the centerline $\mathbf{18}_c$ and $\mathbf{20}_c$ are essentially equal. (Note transmission level at line $T_{PET}$.) Accordingly, it is readily easy to identify a PVC sample passing through the inspection reading by comparing the reading at detector 24 (filter 20) to the reading at detector 22 (filter 18) since the difference in signal levels is significant. Thus, according to the present invention, the relative signal strengths to be compared are much more readily identified.

The bandpass filter 18 for detector 22 is chosen so that it 1) passes a higher amount of infrared light for a PVC sample than does filter 20 for detector 24 (i.e. 98% compared to 55% as discussed above), and 2) the filter 18 for detector 22 is chosen so that it passes an amount of infrared light for PET which is essentially equal to the amount of infrared light passed for PET by filter 20 of detector 14. It is this latter feature of the selection of filter 18 which is particularly important in that it enables the identification of a contaminant sample of PVC present in the inspection region when product samples of PET are also present in the inspection reading. The present invention enables the distinction of flakes even when they are stacked or bunched, a capability not enjoyed by the prior art systems discussed herein. In the process of identifying the particular material passing the inspection station, the transmission readings for photodiode detectors 22 and 24 are compared as a ratio or are compared directly as one detection output to the other. Therefore, if the material passing each detectors 22 and 24 is PET, the ratio is always essentially 1.00, or in the instance of direct readings, are nearly equal, since the particular filters 18 and 20 are selected such that they each pass an equivalent amount of the infrared radiation for the selected base sample, here PET. As was previously mentioned, when flake or particulate plastic materials are being sorted, it is frequent that multiple flakes will be stacked or bunched when passing the detection region. Illustrated in Table I below are transmission levels of infrared wave lengths received at detectors 22 and 24 for various numbers of flakes of particulate materials, together with a comparison of the signals received by detectors 22 and 24. As may be readily concluded, when PET, irrespective of the number of flakes, passes detectors 22 and 24, the ratio of the respective readings is 1.00. When either a single flake of PVC passes the respective detectors 22 and 24 or there are multiple PET and PVC flakes, the relative levels of transmission recorded by detectors 22 and 24 diminish with the increased numbers of flakes, however, it should be noted that the ratio signal between the two detectors is relatively constant at 1.76 to 1.78 for the instances of stacked flakes shown, and about 1.10 for the instances of bunched flakes (i.e., side by side), rendering a very reliable sort or analysis to be undertaken.

When the reflection mode is employed, while the light levels at the respective detectors may be varied from the transmission examples, the ratio of the observed emissions are maintained.

TABLE I

| Samples | Detector A Filter (% Transmission) | Detector B Filter (% Transmission) | Ratio A/B |
|---|---|---|---|
| Stacked Samples | | | |
| 1 PET | 85% | 85% | 1.00 |
| 2 PET | 72% | 72% | 1.00 |
| 3 PET | 61% | 61% | 1.00 |
| 4 PET | 52% | 52% | 1.00 |
| 1 PVC | 98% | 55% | 1.78 |
| 1 PET, 1 PVC | 83% | 47% | 1.77 |
| 2 PET, 1 PVC | 71% | 40% | 1.78 |
| 3 PET, 1 PVC | 60% | 34% | 1.76 |
| 4 PET, 1 PVC | 51% | 29% | 1.76 |
| Bunched Samples | | | |
| 1 PET | 97% | 97% | 1.00 |
| 2 PET | 94% | 94% | 1.00 |
| 3 PET | 91% | 91% | 1.00 |
| 4 PET | 88% | 88% | 1.00 |
| 1 PVC | 100% | 91% | 1.10 |
| 1 PET, 1 PVC | 97% | 88% | 1.10 |
| 2 PET, 1 PVC | 94% | 85% | 1.11 |
| 3 PET, 1 PVC | 91% | 82% | 1.11 |
| 4 PET, 1 PVC | 88% | 79% | 1.11 |

As contrasted by the prior art systems described in the Scott paper or the '217 patent where the filters at such as 18 or 20 are chosen in order that their bandpass region centers on the absorption peaks of PET and PVC, the readings become irregular and unreliable. Table 2 below illustrates the respective levels of transmission on detectors centered at the absorption peaks (transmission nulls) for PET alone, PVC alone, and mixtures of PET and PVC. It may be noted that the ratio of the reading of the first detector to the second detector varies from 0.66 to 1.40 for the instances shown of stacked flakes, and from about 0.84 to about 1.10 for the instances shown of flakes bunched (i.e., side by side). It may be observed that ratio values for instances having bunched PVC may overlap the values of instances having only PET. Accordingly, it may be concluded that as more PET flakes are present with PVC flake, the PVC becomes hidden by the PET and the ratio observed at the detectors decreases. At 3 PET flakes or more with I PVC, the PVC is not readily detectable. This is for flakes of equal thickness. In practice it is quite probable that there will be a thick PET flake with a thin PVC flake as PET plastic bottles typically have thick necks and bases and thin sidewalls. In such a case even one PET flake can hide the presence of a PVC flake.

TABLE 2

| Samples | Detector A Filter (% Transmission) | Detector B Filter (% Transmission) | Ratio A/B |
|---|---|---|---|
| Stacked Samples | | | |
| 1 PET | 67% | 85% | 0.79 |
| 2 PET | 45% | 72% | 0.63 |
| 3 PET | 30% | 61% | 0.49 |
| 4 PET | 20% | 52% | 0.37 |
| 1 PVC | 98% | 55% | 1.78 |
| 1 PET, 1 PVC | 66% | 47% | 1.40 |
| 2 PET, 1 PVC | 44% | 40% | 1.10 |
| 3 PET, 1 PVC | 29% | 34% | 0.85 |
| 4 PET, 1 PVC | 19% | 29% | 0.66 |
| Bunched Samples | | | |
| 1 PET | 93% | 97% | 0.96 |
| 2 PET | 89% | 94% | 0.95 |
| 3 PET | 80% | 91% | 0.88 |
| 4 PET | 74% | 88% | 0.84 |
| 1 PVC | 100% | 91% | 1.10 |
| 1 PET, 1 PVC | 93% | 88% | 1.06 |
| 2 PET, 1 PVC | 86% | 85% | 1.01 |
| 3 PET, 1 PVC | 80% | 82% | 0.98 |
| 4 PET, 1 PVC | 73% | 79% | 0.92 |

Figure 3:
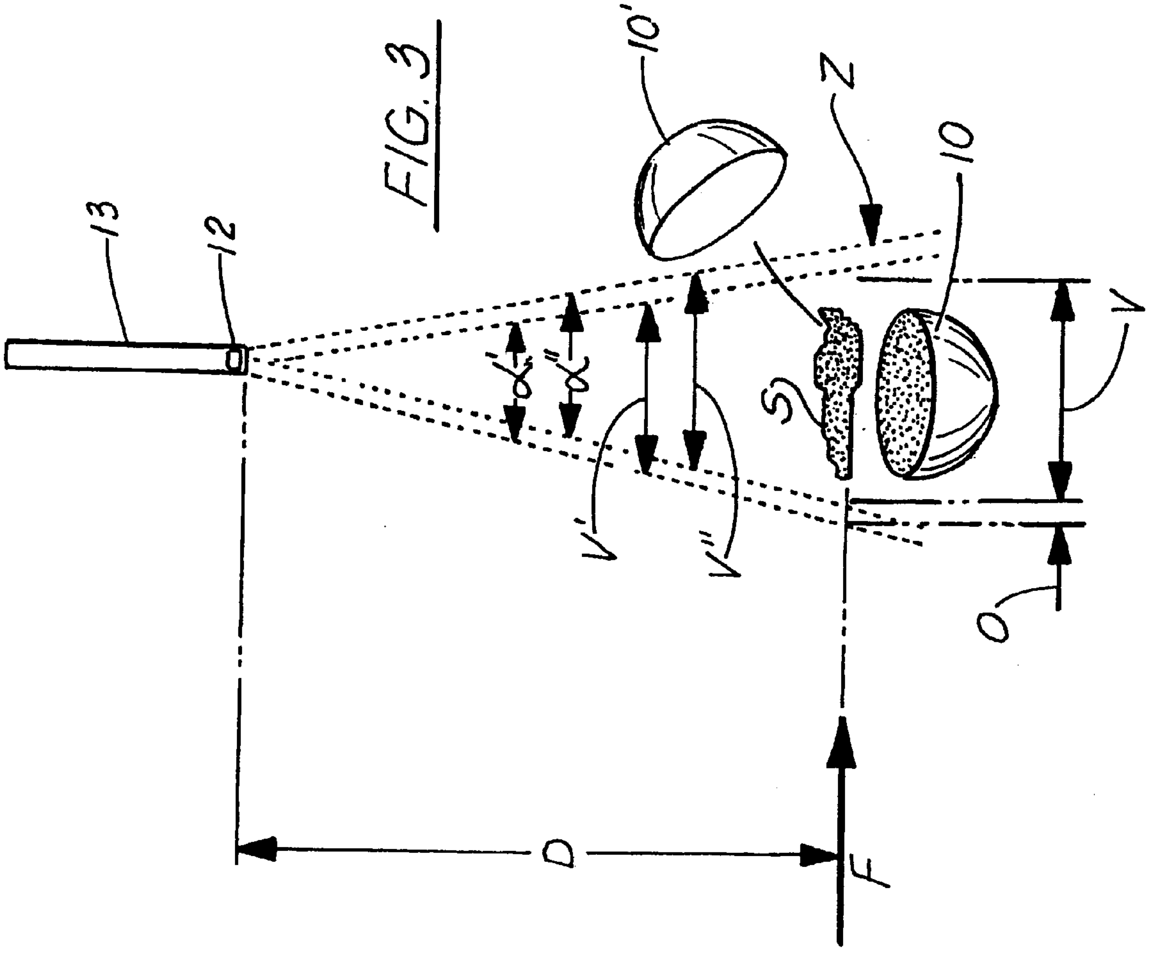

Referring now to FIG. 3, a further feature of the present invention is illustrated. It should be noted that in the illustration of the relative positioning of infrared light sources 10 and 10' and fiber cable 13 and faceplate 12, that no lenses for focusing of the electromagnetic energy are utilized as are illustrated in the Scott paper and patent '217 though such lenses may be added if one skilled in the art feels the additional cost is justified. The infrared source may include a reflector behind it to more efficiently reflect the radiation toward the sample. Additionally, it has been discovered that a gold reflector is significantly more effective than a silver or aluminum reflector. It has been determined that such lenses may be eliminated by the illustrated positioning of the fiber optic faceplate collecting the light which has illuminated sample S. Sample S travels the inspection area, generally noted at Z, as the flow of material progresses as is illustrated along arrow F. In the illustrated embodiment, fiber optic cable 13 is made up of multiple optical fibers 13*a* and 13*b* representing individual fibers collected to one or the other of branches 14 and, 16 to the detectors 22 and 24. As may been seen in FIG. 3*a,* the faceplate 12 of the fiber optic cable 13 is the termination of the plurality of the several individual fiber optic strands 13*a* and 13*b* in the cable by directly interfacing faceplate 12 by the termination of each of the multiple fiber optic strands 13*a* and 13*b*. The relevant detectors 22 and 24 connected respectively to the strands 13*a* and 13*b* of branches 14 and 16 are thus assured of receiving the same signal from each of the respective strands 13*a* and 13*b*.

In order to assure that the collective fibers or strands 13*a* and the collective strands 13*b* are all exposed to substantially the same level of radiation from of the sample S, the faceplate 12, being the termination of the fiber optic cable 13, is disposed at a distance D which is chosen so that the field of view of each of the individual fiber strands (i.e., V' and V") which are furthermost apart in the faceplate 12, i.e., opposite each other across the diameter of the faceplate, each fully view an area that is large in comparison with the offset of the two fields of view. In FIG. 3 the offset is designated at O and the entire field of view is illustrated by V. In practice, the diameter of the faceplate 12 approximately equals the distance between fibers diametrically opposite the circular faceplate 12. It is preferred that this ratio of field of view V versus offset O is by a factor of 5 or more, at the plane of examination, i.e., along flow path F. In the illustrated embodiment, the faceplate 12 terminating fiber optic cable 13 is positioned at a distance D with the infrared light sources 10 and 10' positioned relatively closely to the passing samples S which ensures a thorough illumination of each sample passing through the detection zone. By maintaining a sufficient distance D and the V>O ratio at 5 or more, there is a significant reduction in edge effects (signal variation artifacts) otherwise due to the specimen giving the effect of passing through an inspection zone with respect to each fiber optic strand. Likewise, if the fiber ends in the faceplate 12 are closer to the specimen passing through the detection zone Z than is taught by the present invention, a significant variation in signal readings from the two detectors 22 and 24 results which may be attributed to the motion of the specimen as opposed to the composition of the specimen. As should be appreciated by those skilled in the art, such aberrations interfere with the accuracy of the material identification accomplished by comparing varying signal levels at the two detectors. Fiber optic cables of the type used herein are available from such as MultiMode Fibers and exhibit a field of view angle (∝' for 13*a*, and ∝" for 13*b* of about 25°. Accordingly, by positioning the infrared source and fiber optic cable as detailed above, the use of lenses to focus the infrared beam upon the specimen and then, again, to focus the light transmitted through the specimen back to the fiber bundle is avoided. Those skilled in the art recognize that such lenses are costly and even more problematic insofar as being kept clean and properly adjusted to assure maximum consistency in signal level strength and continuity across the faceplate of the fiber bundle.

It should be appreciated that more than two fiber optic bundles of strands 13*a* and 13*b* and detectors may be utilized if there is advantage in looking at more than two wave lengths of infrared radiation emanating from specimens passing through the detection zone. Additional strands and associated detectors may be utilized as described in relation to FIG. 1 to detect such as color variations in a particular type of specimen, i.e. clear and blue PET, and other polymer types in the feed stream, e.g., PEN and PS. Specific frequencies for filters 18, 20 and 21 or more (if desired) are centered as taught above, namely, the contaminant dominant absorptive peak as the center of the first filter, and the second filtered, on the frequency of the level of energy response of the non-contaminant at the center of the first filter. A third filter may be centered on the absorptive peak of a second contaminant, with the second filter revised to center on the common level response for the non-contaminant, mounting the signal ratio close to 1 for the target materials and causing the ratios to vary therefrom for the contaminant to be ejected.

Figure 4:
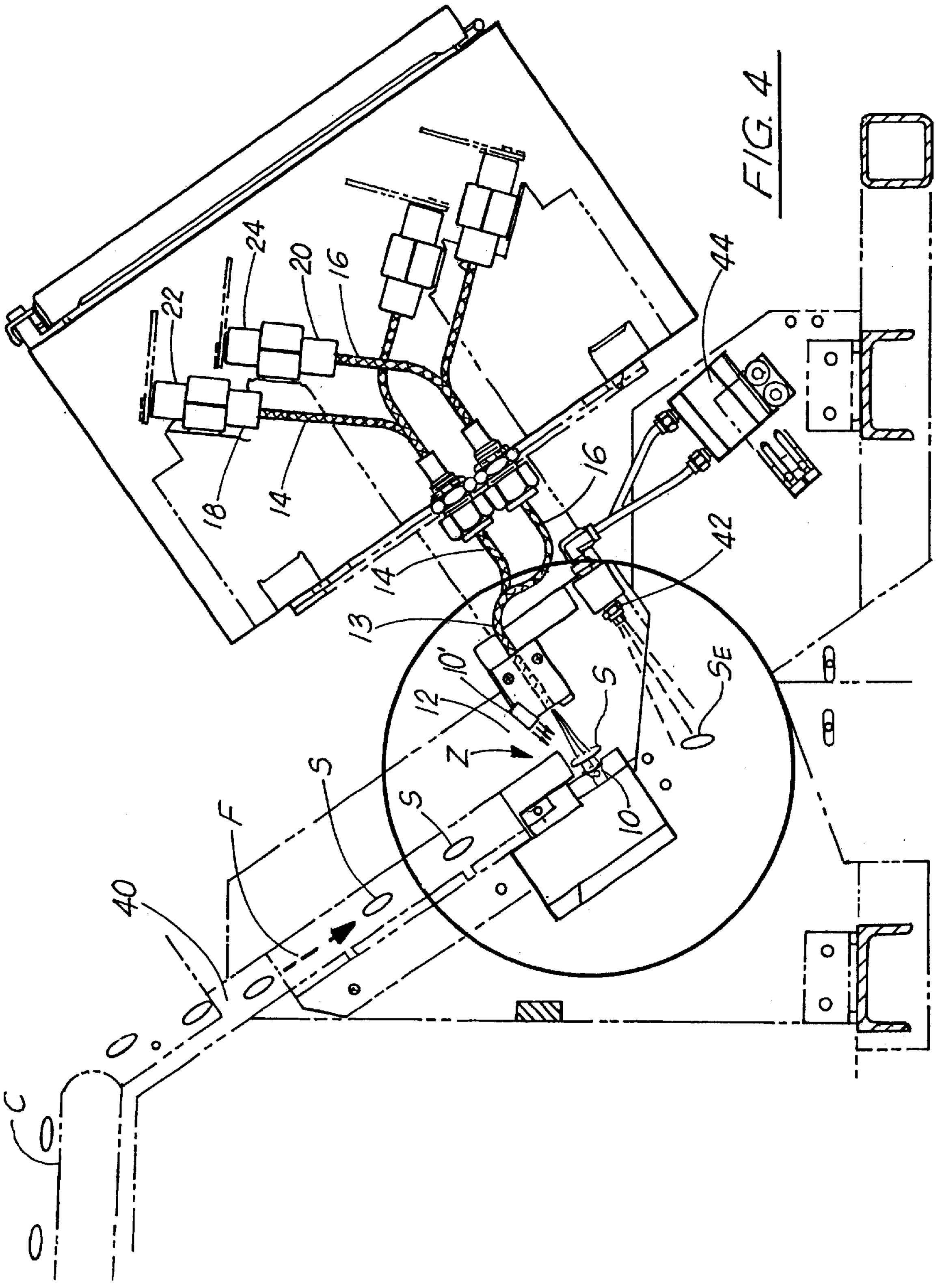
FIG. 4 is a partial side view of the apparatus of the present invention.

FIG. 4 illustrates the installation of the infrared illuminator 10 (and 10', if reflection mode is utilized) and the faceplate 12 of the fiber optic cable 13 when disposed in an inspection line. It should be noted in the illustrated embodiment that transmission of infrared light through the samples is preferably utilized and that the feed stream F is located on an angle with respect to a conveyor or other transportation means to bring the material to be examined to the detection zone. In the illustrated embodiment of the invention wherein flake material is examined, conveyor C brings the supply of flake material sample S to a series of shallow channels 40, which are disposed at an angle of approximately 60 degrees to the horizontal line of conveyor C. The material of sample S on the conveyor C is directed to one of the several side-by-side channels 40 and permitted to flow via free fall down the channel 40 toward the detection zone Z. In the present embodiment a vibrating feed type conveyance is used. Since some contaminant flakes, particularly PVC may be so small as to be undetectable, they may be conveniently mechanically screened as they transition from conveyor C to channel 40. At the area of detection zone, intermediate fiber optic faceplate 12 and infrared source 10, the channel 40 abruptly terminates and the material to be inspected transits the inspection zone Z generally in a free fall maintaining the velocity gained as it traveled down channel 40 in the feed stream. An illustrative specimen S is illustrated in the detection zone where its character as part of desired material or contaminant is determined. In the event the material is contaminant $S_E$, it is ejected as by air nozzle 42 disposed downstream of the detection zone Z. Air ejection of sorted plastics in recycle systems is well known and those skilled in the art will understand the parameters for providing a signal to the air valve 44 to provide the ejection stream at air nozzle 42. It is conventional that the contaminant sample $S_E$ is identified positively by the microprocessor and selected for ejection by air nozzle 42. In the illustrated embodiment the microprocessor may be alternatively instructed to identify and pass all non-contaminant samples and to eject all samples which are not non-contaminant samples (i.e., all contaminant samples. This method is particularly effective wherein more than one contaminant material is to be identified and ejected (herein PET). In the illustrated embodiment for sorting flakes, 16 channels are utilized in the sorting of flake material, the channels being side by side and disposed such that each has its own illuminating infrared source 10 and detection assembly including fiber optic faceplate 12, cable 13 and individual cables 14 and 16 associated with respective filters 18 and 20 and detectors 22 and 24.

While various embodiments of the invention have been described, it should be understood that each is capable of further modification and this description of invention is intended to cover any variations, uses or adaptations of the invention as come within knowledge or customary practice in the art to which this inventions pertains, and as may be applied to the essentially features heretofore set forth and falling within the scope of the invention as described by the appended claims.

I claim:

1. A method of distinguishing samples of at least a first plastic material and a second plastic material having different electromagnetic energy reflection, absorption and penetration characteristics, comprising the steps of:

conveying samples of plastic materials to be distinguished from at least one inlet toward at least one outlet through an electromagnetic energy illumination zone;

illuminating the samples with electromagnetic energy while transiting the illumination zone;

receiving electromagnetic energy passing through the samples while transiting the illumination zone;

splitting the received electromagnetic energy passing through the samples into a first stream and a second stream;

passing the electromagnetic energy of said first stream through a bandpass filter having a preselected bandwidth characterized in that the first plastic material exhibits an absorptive peak of the electromagnetic energy passing through a sample of the first plastic material, and for which the second plastic material exhibits a higher level of electromagnetic energy passing through a sample of the second plastic material than a sample of said first plastic material;

passing the electromagnetic energy of said second stream through a bandpass filter having a second preselected band characterized in that the level of electromagnetic energy passing through the second plastic material is about equal to the level of electromagnetic energy passing through the second plastic material passed by said first bandpass filter;

measuring the level of the electromagnetic energy of an illuminated sample passed by said first bandpass filter;

measuring the level of the electromagnetic energy of said illuminated sample passed by said second bandpass filter; and comparing the respective levels of electromagnetic energy of said illuminated sample passed by said first bandpass filter and said second bandpass filter.

2. A method according to claim 1 wherein the electromagnetic energy illuminating the samples is in the infrared range.

3. A method according to claim 2 wherein the energy of the first stream is passed through a bandpass filter which is centered on the absorptive peak of the first plastic material.

4. A method according to claim 3 wherein the total number of samples of the first plastic material is less than one half of the total number of samples of the first and second plastic materials passing through the electromagnetic energy illumination zone.

5. The method according to claim 1 wherein the bandwidth of the first and second bandpass filters is substantially equal.

6. The method according to claim 5 wherein the bandwidth of said bandpass filters is between about 15 nanometers and about 40 nanometers.

7. The method according to claim 6 wherein the bandwidth of said filters is about 30 nanometers.

8. Apparatus for distinguishing samples of at least a first plastic material and a second plastic material having different electromagnetic energy absorption and penetration characteristics, comprising the steps of:

conveying means moving samples of plastic materials from an inlet end to an outlet end having an electromagnetic energy illumination zone intermediate the inlet end and outlet end;

an electromagnetic energy source disposed adjacent the illumination zone; and receiving means for receiving electromagnetic energy passing through samples of plastic materials illuminated by said electromagnetic energy source;

a beamsplitter for separating the received electromagnetic energy passing through a sample into a first stream and a second stream;

a bandpass filter for filtering the electromagnetic energy of said first stream, said filter having a preselected bandwidth characterized in that the first plastic material exhibits an absorptive peak of the electromagnetic energy passing through the sample, and for which a the second plastic material exhibits a higher level of electromagnetic energy passing therethrough;

a second bandpass filter for filtering the electromagnetic energy of said second stream, said filter having a second preselected band width characterized in that the level of electromagnetic energy passing through the second plastic material is about equal to the level of electromagnetic energy passing through the second plastic material passed by said first bandpass filter;

means for measuring the level of the electromagnetic energy of an illuminated sample of plastic material passed by said first bandpass filter;

means for measuring the level of the electromagnetic energy of an illuminated sample of plastic material passed by said second bandpass filter; and means for comparing the respective levels of electromagnetic energy of said illuminated sample passed by said first bandpass filter and said second bandpass filter.

9. The apparatus of claim 8 wherein the electromagnetic energy source emits in the infrared range.

10. The apparatus of claim 9 wherein said first bandpass filter is centered on the absorptive peak of the first plastic material.

11. The apparatus of claim 10 wherein the bandwidth of the first and second bandpass filters is substantially equal.

12. The apparatus of claim 11 wherein the bandwidth of said bandpass filters is between about 15 nanometers and about 40 nanometers.

13. The apparatus of claim 12 wherein the bandwidth of said filters is about 30 nanometers.

14. Apparatus according to claim 8 wherein said receiver means for receiving electromagnetic energy passing through samples of plastic materials transiting said illumination zone includes a fiber optic cable having disposed therein at least two sets of a plurality of individual fibers, each for carrying electromagnetic energy to one of said bandpass filters, the receiving end of said fiber optic cable being terminated in a faceplate and disposed adjacent to said illumination zone at a distance within which each fiber of each of said sets receives substantially the same level of energy passing through a sample of the plastic materials.

15. Apparatus according to claim 14 wherein said faceplate of said receiver means is disposed a distance from the illumination zone such that the ratio of the field of view of a fiber terminating in the faceplate, as measured at the illumination zone, to the distance between diametrically opposite fibers on the periphery of the faceplate is a factor of about five or more.

16. A method of distinguishing samples of at least a first plastic material and a second plastic material having different electromagnetic energy reflection, absorption and penetration characteristics, comprising the steps of:

conveying samples of plastic materials to be distinguished from at least one inlet toward at least one outlet through an electromagnetic energy illumination zone;

illuminating the samples with electromagnetic energy while transiting the illumination zone;

receiving electromagnetic energy reflected from the samples while transiting the illumination zone;

splitting the received electromagnetic energy reflected from the samples into a first stream and a second stream;

passing the electromagnetic energy of said first stream through a bandpass filter having a preselected bandwidth characterized in that the first plastic material exhibits an absorptive peak of the electromagnetic energy passing through a sample of the first plastic material, and for which the second plastic material exhibits a higher level of electromagnetic energy reflected from a sample of the second plastic material than a sample of said first plastic material;

passing the electromagnetic energy of said second stream through a bandpass filter having a second preselected band characterized in that the level of electromagnetic energy reflected from through the second plastic material is about equal to the level of electromagnetic energy reflected from the second plastic material passed by said first bandpass filter;

measuring the level of the electromagnetic energy of an illuminated sample passed by said first bandpass filter;

measuring the level of the electromagnetic energy of said illuminated sample passed by said second bandpass filter; and comparing the respective levels of electromagnetic energy of said illuminated sample passed by said first bandpass filter and said second bandpass filter.

17. A method according to claim 16 wherein the electromagnetic energy illuminating the samples is in the infrared range.

18. A method according to claim 17 wherein the energy of the first stream is reflected from a bandpass filter which is centered on the absorptive peak of the first plastic material.

19. A method according to claim 18 wherein the total number of samples of the first plastic material is less than one half of the total number of samples of the first and second plastic materials reflected from the electromagnetic energy illumination zone.

20. The method according to claim 19 wherein the bandwidth of the first and second bandpass filters is substantially equal.

21. The method according to claim 20 wherein the bandwidth of said bandpass filters is between about 15 nanometers and about 40 nanometers.

22. The method according to claim 21 wherein the bandwidth of said filters is about 30 nanometers.

23. Apparatus for distinguishing samples of at least a first plastic material and a second plastic material having different electromagnetic energy absorption and penetration characteristics, comprising the steps of:

conveying means moving samples of plastic materials from an inlet end to an outlet end having an electromagnetic energy illumination zone intermediate the inlet end and outlet end;

an electromagnetic energy source disposed adjacent the illumination zone; and receiving means for receiving electromagnetic energy reflected from samples of plastic materials illuminated by said electromagnetic energy source;

a beamsplitter for separating the received electromagnetic energy reflected from a sample into a first stream and a second stream;

a bandpass filter for filtering the electromagnetic energy of said first stream, said filter having a preselected bandwidth characterized in that the first plastic material exhibits an absorptive peak of the electromagnetic energy reflected from the sample, and for which a the second plastic material exhibits a higher level of electromagnetic energy reflected therefrom;

a second bandpass filter for filtering the electromagnetic energy of said second stream, said filter having a second preselected band width characterized in that the level of electromagnetic energy reflected from the second plastic material is about equal to the level of electromagnetic energy reflected from the second plastic material passed by said first bandpass filter;

means for measuring the level of the electromagnetic energy of an illuminated sample of plastic material passed by said first bandpass filter;

means for measuring the level of the electromagnetic energy of an illuminated sample of plastic material passed by said second bandpass filter; and means for comparing the respective levels of electromagnetic energy of said illuminated sample passed by said first bandpass filter and said second bandpass filter.

24. The apparatus of claim 23 wherein the electromagnetic energy source emits in the infrared range.

25. The apparatus of claim 24 wherein said first bandpass filter is centered on the absorptive peak of the first plastic material.

26. The apparatus of claim 25 wherein the bandwidth of the first and second bandpass filters is substantially equal.

27. The apparatus of claim 26 wherein the bandwidth of said bandpass filters is between about 15 nanometers and about 40 nanometers.

28. The apparatus of claim 27 wherein the bandwidth of said filters is about 30 nanometers.

29. Apparatus according to claim 28 wherein said receiver means for receiving electromagnetic energy passing through samples of plastic materials transiting said illumination zone includes a fiber optic cable having disposed therein at least two sets of a plurality of individual fibers, each for carrying electromagnetic energy to one of said bandpass filters, the receiving end of said fiber optic cable being terminated in a faceplate and disposed adjacent to said illumination zone at a distance within which each fiber of each of said sets receives substantially the same level of energy passing through a sample of the plastic materials.

30. Apparatus according to claim 29 wherein said faceplate of said receiver means is disposed a distance from the illumination zone such that the ratio of the field of view of a fiber terminating in the faceplate, as measured at the illumination zone, to the distance between diametrically opposite fibers on the periphery of the faceplate is a factor of about five or more.

* * * * *